United States Patent
Pham et al.

(10) Patent No.: US 7,370,068 B1
(45) Date of Patent: May 6, 2008

(54) SORTING OF RECORDS WITH DUPLICATE REMOVAL IN A DATABASE SYSTEM

(75) Inventors: Son Pham, Northridge, CA (US); Thu K. Pham, Northridge, CA (US)

(73) Assignee: Teradata US, Inc., Miamisburg, OH (US)

( * ) Notice: Subject to any disclaimer, the term of this patent is extended or adjusted under 35 U.S.C. 154(b) by 743 days.

(21) Appl. No.: 10/234,923

(22) Filed: Sep. 4, 2002

(51) Int. Cl.
G06F 12/00 (2006.01)
G06F 17/30 (2006.01)

(52) U.S. Cl. .............................. 707/205; 707/1; 707/7; 707/200; 707/201; 707/101; 708/203

(58) Field of Classification Search ................... 707/1, 707/3, 7, 10, 101, 102, 104.1, 104, 205; 708/203
See application file for complete search history.

(56) References Cited

U.S. PATENT DOCUMENTS

| | | | | |
|---|---|---|---|---|
| 4,499,555 | A * | 2/1985 | Huang | 707/7 |
| 5,852,826 | A * | 12/1998 | Graunke et al. | 707/7 |
| 5,884,299 | A | 3/1999 | Ramesh et al. | 707/2 |
| 6,105,024 | A * | 8/2000 | Graefe et al. | 707/7 |
| 6,115,705 | A * | 9/2000 | Larson | 707/3 |
| 6,374,266 | B1 * | 4/2002 | Shnelvar | 707/204 |
| 6,381,601 | B1 * | 4/2002 | Fujiwara et al. | 707/7 |
| 6,571,244 | B1 * | 5/2003 | Larson | 707/7 |
| 6,732,096 | B1 * | 5/2004 | Au | 707/5 |
| 6,775,682 | B1 * | 8/2004 | Ballamkonda et al. | 707/102 |

OTHER PUBLICATIONS

S. Chaudhuri et al., "Optimizing Queries with Materialized Views," Proceeding of International Conference on Data Engineering, pp. 1-25 (1995).

S. Chaudhuri et al., "Including Group-By in Query Optimization," VLBD, pp. 354-366 (1994).

J. Gray et al., "Data Cube: A Relational Aggregation Operator Generalizing Group-By, Cross-Tab, and Sub-Totals," Proceeding $12^{th}$ International Conference on Data Engineering, pp. 29-53 (1996).

(Continued)

Primary Examiner—John Cottingham
Assistant Examiner—Susan F Rayyan
(74) Attorney, Agent, or Firm—Trop, Pruner & Hu, P.C.

(57) ABSTRACT

A database system includes an enhanced technique for performing sorts in which removals of duplicate records are performed to compact the size of segments being sorted. To enhance a query plan, the duplicate record removal is performed as early in the query plan as possible. By removing duplicate records early in the query plan, the number of input/output (I/O) operations is reduced, resulting in more efficient usage of database system resources. In example implementations, two type of sorts are performed: a heap sort (to sort successive segments of an input file, with the sorting associated with concurrent removal of duplicate records to compact each segment so that a smaller number of I/O accesses is needed); and a merge sort (in which output files from prior sorting passes are merged and sorted, with the merge sort process also associated with the removal of duplicate records to further compact the data segments and reduce the number of I/O accesses).

21 Claims, 11 Drawing Sheets

OTHER PUBLICATIONS

A. Gupta, "Generalized Projections: A Powerful Approach to Aggregation," VLBD, pp. 1-26 (1995).

S. Grumbach et al., "Querying Aggregate Data," PODS '99, pp. 174-185 (1999).

M. Muralikrishna, "Improved Unnesting Algorithms for Join Aggregate SQL Queries," Proceeding of 18th VLDB Conference, pp. 91-102 (1992).

M. Rafanelli et al., "The Aggregate Data Problem: a System for their Definition and Management," ACM Sigmod Record, pp. 8-13 (Dec. 1996).

* cited by examiner

FIG. 9

```
// class Sort includes heap sort with elimination of duplicates
class Sort
{
   public static int heapsort2( Record [ ] a)
   {
      int Length = a.length;
      int rootA = Length-1;  //position of root in the Array for( int i = Length / 2; i > 0; i-- )        /* buildHeap */
         percDown2( a, i, Length );
      int LastIndex = 0;  //init new length of the sorted array          } 502

// first time to swap
         Record temp = a[rootA]; // hold the root after swap
         a[rootA] = a[0];// delete root: the last index in the array      } 504
         a[0] = temp;
         LastIndex++;
   // second and after with elimination of duplicates.
   for( int i = rootA; i > 0; i-- )/*sorting: need to do i=1 for count*/
      { //i = size of array
         //TestSort.print (a, a.length);                                  } 506
         percDown2( a, 1, i);          // 1 and i are two ends
                        //of children-parent tree // add codes to remove duplicates.
      if (a[rootA].key == temp.key)
         {// count up for duplication                                     } 508
            a[LastIndex -1].count += a[rootA].count;
            a[rootA] = a[Length-i]; // move last element up
         }
         else if (Length-i==LastIndex)
            { temp = a[rootA];
               swapReferences( a, rootA, Length-i );                      } 512
               LastIndex++;
            }
         else
         { a[LastIndex] = a[rootA];
            a[rootA] = a[Length-i];                                       } 510
            temp = a[LastIndex];
            LastIndex++;
         }

{// end For
      return LastIndex;
   } // end of heapsort2
```

FIG. 10

```
// i is the parent root where the heap need to be fixed,
// N = last index the child can be = size of the considered array
private static void percDown2( Record [ ] a, int i, int N )
    {
      int Length = a.length;
      int parent=i;
      int child = 2*i;
      Record tmp=a[Length -i];
      while ( child <= N)
      {
         if( child < N )
            if (a[Length-child].key > a[ Length-1 -child ].key )
                  child++;
         if( a[Length-child ].key < tmp.key )
               a[ Length-parent ] = a[ Length-child ];
         else  break;

parent = child;
         child = 2*parent;
      }
      a[Length-parent ] = tmp;
   }// end of perdown2
```

FIG. 11

```
public static void swapReferences( Record [ ] a, int i1, int i2 )
       {
         Record tmp = a[i1 ];
         a[i1 ] = a[i2 ];
         a[i2 ] = tmp;
       }
```

SORTING OF RECORDS WITH DUPLICATE REMOVAL IN A DATABASE SYSTEM

BACKGROUND

A database system stores a collection of logically related data. A popular type of database system is the relational database management system (RDBMS), which stores relational tables made up of rows and columns. Each row represents an occurrence of an entity defined by a table, with an entity being a person, place, or thing about which the table contains information.

To extract data from, or to update, a relational table, queries according to a standard database query language (e.g., Structured Query Language or SQL) are used. Examples of SQL statements include INSERT, SELECT, UPDATE, and DELETE. The SELECT statement is used to retrieve information from the database and to organize information for presentation to a user or to an application program. The INSERT, UPDATE and DELETE statements specify other types of operations in a database system.

In many database operations, sorting is usually performed on records of one or more tables acted upon by a query. In performing such sorts, it is desirable to reduce the number of input/output (I/O) accesses that occur. I/O accesses are typically expensive in terms of the time required to perform each I/O access, and the physical resources that are consumed to perform the I/O access.

This is particularly a concern when large input files have to be sorted. To perform a sort of the records of an input file, the records are usually moved to temporary storage (e.g., cache) in a processing system. The temporary storage is usually much smaller (and faster) than persistent or main storage (e.g., hard disk drives or disk arrays). For sorts of large input files that are many times larger than the size of the temporary storage, a large number of I/O accesses are required to perform the sort (or other operation) by the processing system since records will have to be repeatedly moved between the temporary storage and persistent storage to perform the sort (or other operation). This may result in reduced efficiency and increased processing time of the database system when processing queries.

SUMMARY

In general, a mechanism is provided to enhance the efficiency of performing sorting and other database operations by reducing the number of input/output (I/O) accesses that are employed. For example, a method of processing a file that is larger than a size of a buffer in a system includes retrieving segments of a file into the buffer and sorting each segment in the buffer. Duplicate records are removed while sorting each segment to compact data in the segment. The sorted and compacted data is then written to a main storage of the system.

Other or alternative features will become more apparent from the following description, from the drawings, and from the claims.

BRIEF DESCRIPTION OF THE DRAWINGS

FIGS. 9-11 illustrate pseudocodes for implementing the heap sort algorithm according to one embodiment.

DETAILED DESCRIPTION

In the following description, numerous details are set forth to provide an understanding of the present invention. However, it will be understood by those skilled in the art that the present invention may be practiced without these details and that numerous variations or modifications from the described embodiments are possible.

Various mechanisms are provided to improve the performance of database operations specified by certain types of queries, such as queries that involve group-by operations. A group-by operation is typically specified by inserting a GROUP-BY clause into a SELECT statement. A benefit offered by performing a group-by operation is that the number of rows of base relations or intermediate join relations are reduced as a result of grouping. Grouping according to a specified group-by attribute means that rows with duplicate group-by attribute values are eliminated, with an aggregate function applied on one or more other specified attributes. By moving the group-by operation early in execution of a query, a smaller number of rows of each table are processed later in the execution, which reduces the amount of spool space needed to store intermediate results and thus the number of input/output (I/O) accesses needed to read and write data.

Figure 1:
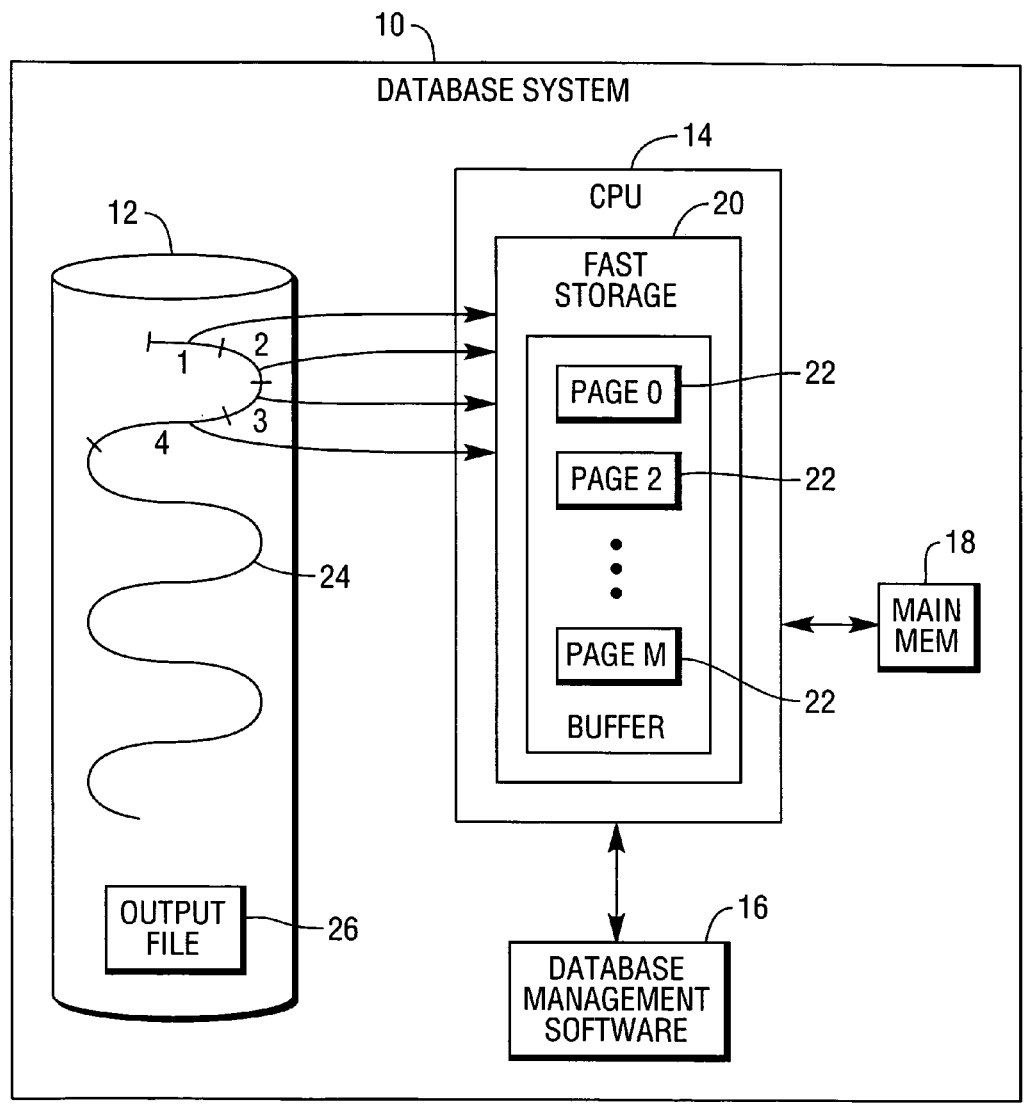
FIG. 1 is a block diagram of an example database system that incorporates an embodiment of the invention.

However, under certain conditions, cost savings in terms of a reduction of I/O accesses may not occur even though group-by operations are applied early in a query execution. One such scenario is where an input source table is a relatively large file that has to be processed in segments. This is illustrated in FIG. 1, which shows an example arrangement of a database system 10. The database system 10 includes a persistent or main storage 12, which can be in the form of a hard disk drive or hard disk drives. Other types of persistent storage are used in other embodiments, such as tape media, optical media, and so forth. Persistent or main storage has the characteristic that data stored in the persistent or main storage is maintained even though the system is powered off, rebooted, or power cycled.

The database system 10 also includes a central processing unit (CPU) 14 for executing various software programs, including database management software 16, in the database system 10. Although shown as a single component, each of the storage 12 and CPU 14 can also represent multiple components, such as multiple storage devices or multiple CPUs.

The CPU 14 is connected to main memory 18. In addition, the CPU 14 is associated with a relatively fast storage 20, which is typically in the form of cache memory. Each of the fast storage 20 and main memory 18 is considered temporary or volatile storage, since data stored in the fast storage 20 or main memory 18 is lost in response to the system powering off or rebooting. The cache 20 contains a buffer that is capable of storing multiple pages 22 of information. The pages 22 are used to store data that are processed by the CPU 14. In other embodiments, the buffer with multiple pages 22 can be stored in the main memory 18. For purposes of the following discussion, the term "buffer" is used to generally refer to any buffer stored in any temporary or volatile storage for temporarily holding data.

In the described embodiments, the input source table or file 24 is assumed to be a relatively large table such that the entire table cannot be stored in the buffer. Instead, the input source table or file 24 has to be broken into multiple segments that are retrieved separately into the buffer for processing (one segment at a time) by the CPU 14 under control of the database management software 16. Note that the multiple segments can have the same or different sizes.

The improved processing of a query that includes a GROUP-BY clause is described in the context of the following example Structured Query Language (SQL) statement:

SELECT T1.A, SUM (T1.B)
FROM T1, T2
WHERE T1.A=T2.C
GROUP BY T1.A;

The example query statement above performs a join of tables T1 and T2 based on join conditions T1.A (attribute A of table T1) being equal to T2.C (attribute C of table T2). The WHERE clause specifies a search condition that must be satisfied by each row returned in the result table. The rows that meet the search condition form an intermediate set, which is then processed further according to specifications in the SELECT clause (in this example T1.A and SUM (T1.B)). The GROUP-BY clause specifies a grouping function according to the T1.A field. Fields specified in the GROUP-BY clause are referred to as "group-by fields."

The example query specifies both a group-by operation and an aggregate function (SUM). If applied early in the query plan, the grouping function along with the aggregate function has the effect of reducing records by eliminating duplicate records having the same value of the group-by field or attribute (T1.A in the example above), while updating the aggregate of the attribute value (T1.B in the example above) so that the number of records involved in I/O is reduced.

For example, a row is arranged as {T1.A, T1.B . . . }. A first row is {2, 5, . . . }, while a second row is {2, 8, . . . }. The first and second rows are considered "duplicates" in the sense that they share the same value of T1.A, which is the grouping or group-by field or attribute. Therefore, for purposes of sorting, one of the duplicate rows can be removed, with the aggregate SUM (T1.B) updated by adding T1.B=8 to T1.B=5. The aggregate SUM(T1.B) associated with T1.A=2 is stored in some predefined data structure, with this data structure updated each time a duplicate row having T1.A=2 is removed. Other data structures for tracking aggregates of other T1.A values are also stored by the database system.

As used in this discussion, removal or elimination of duplicate records refers to the elimination of a row or other predefined part of a table that share a common attribute (e.g., a common value of a group-by attribute) with another row or other predefined part of the table.

Embodiments of the invention are also applicable to queries containing aggregate functions but not GROUP-BY clauses. In other words, although the description makes reference to group-by operations, some embodiments of the invention can be applied to improve the performance of other database operations that do not involve group-by operations.

In accordance with some embodiments of the invention, in cases where the input source table or file 24 is large such that the buffer in cache 20 or memory 18 is unable to store the entire input file, improved sorting techniques are used to take advantage of the duplicate row elimination characteristic on group-by fields. Effectively, the group-by operation can be performed concurrently with sorting operations that are performed in the query plan. By eliminating duplicate rows as early as possible in the sorting process, CPU processing time and I/O processing time are reduced.

In addition to enhanced sorting techniques, associated with duplicate row removal, some embodiments of the invention also use a coupling mechanism and/or a feedback mechanism to increase the size of the records being output by the CPU 14 to a result file in the main storage 12 to avoid as much as possible the output of incomplete pages of records to the main storage 12. Instead, incomplete pages are coupled to or fed back to a subsequent run so that a full page can be constructed, with the full page outputted by the CPU 14 to the main storage 12. A "full page" refers to a set of data that completely fills one of the pages 22 in the buffer. Generally, writing a full page of data to main storage 12 is more efficient than writing partial pages to main storage 12. The coupling and feedback mechanisms are discussed further below.

In the example of FIG. 1, M pages 22 are provided in the buffer. In the ensuing discussion, the pages are referred to as page 22_1, page 22_2, up to page 22_M. Each page 22 is able to store a page of records from the input source table 24. As used here, a "page" refers generally to a predefined block of data, with the size of the block set by the system, by a system administrator, or by the configuration or arrangement of the cache 20 or main memory 18.

Because of the relatively large size of the input source table or file 24, the records of the source table or file 24 are divided into segments that are transferred successively from the main storage 12 to the buffer. In the example, the first segment is referred to as SEGMENT 1, the second segment is referred to as SEGMENT 2, and so forth. As noted above, the segments do not have to be of the same size. The segments are read by the CPU 14 from the main storage 12 into the pages 22 of the buffer, where the CPU 14 performs processing of the retrieved records. In one embodiment, the processing includes performance of a heap sort with duplicate row removal to eliminate duplicate rows of records on the group-by fields.

Heap sort refers to a sorting algorithm that converts an array to be sorted into a heap (represented as a binary tree), followed by successively moving out a maximum value of the heap and rebuilding the heap with one fewer element. Although reference is made to heap sort in the description, other types of sorting algorithms are used in other embodiments.

As a result of duplicate row removal during the sort, each segment retrieved into a corresponding buffer is compacted; that is, the size of the retrieved segment is reduced. As a result, after applying the heap sort on a segment (which initially fills up the entire buffer), the compacted segment only partially fills the buffer.

In the following discussion, reference is made to a "run" and "pass." A "run" involves the processing of records that have been transferred from the main storage 12 into the buffer, followed by writing at least a portion of the processed records into an output file (referred to as a "run file") in the main storage 12 (or in some other persistent storage). A "pass" is a combination of "runs" to process all records of the input file (or input files). A first pass is referred to as Pass 0, which is the pass in which the heap sort with duplicate row removal is performed to sort and compact the input source file 24. The output of Pass 0 includes multiple output files (referred to as run files of Pass 0). After Pass 0, a subsequent pass, referred to as Pass 1, is performed, in which the run files of Pass 0 are input to the buffer and processed further by the CPU 14. Because all run files may not fit into the buffer, successive groups of run files are loaded one group at a time into the buffer for processing. In Pass 1, multiple run files from Pass 0 are merged and compacted (by performing duplicate row removal). The merged and compacted records are then output to run files of Pass 1. Further passes (Pass 2, Pass 3, . . . ) are performed to repeatedly retrieve run files from previous passes to further merge and compact data, until one output file 26 has been created that contains sorted records of the input source table 24, with all duplicate records removed. The final output file 26 in effect contains sorted distinct records of the input file 24.

Figure 2A:
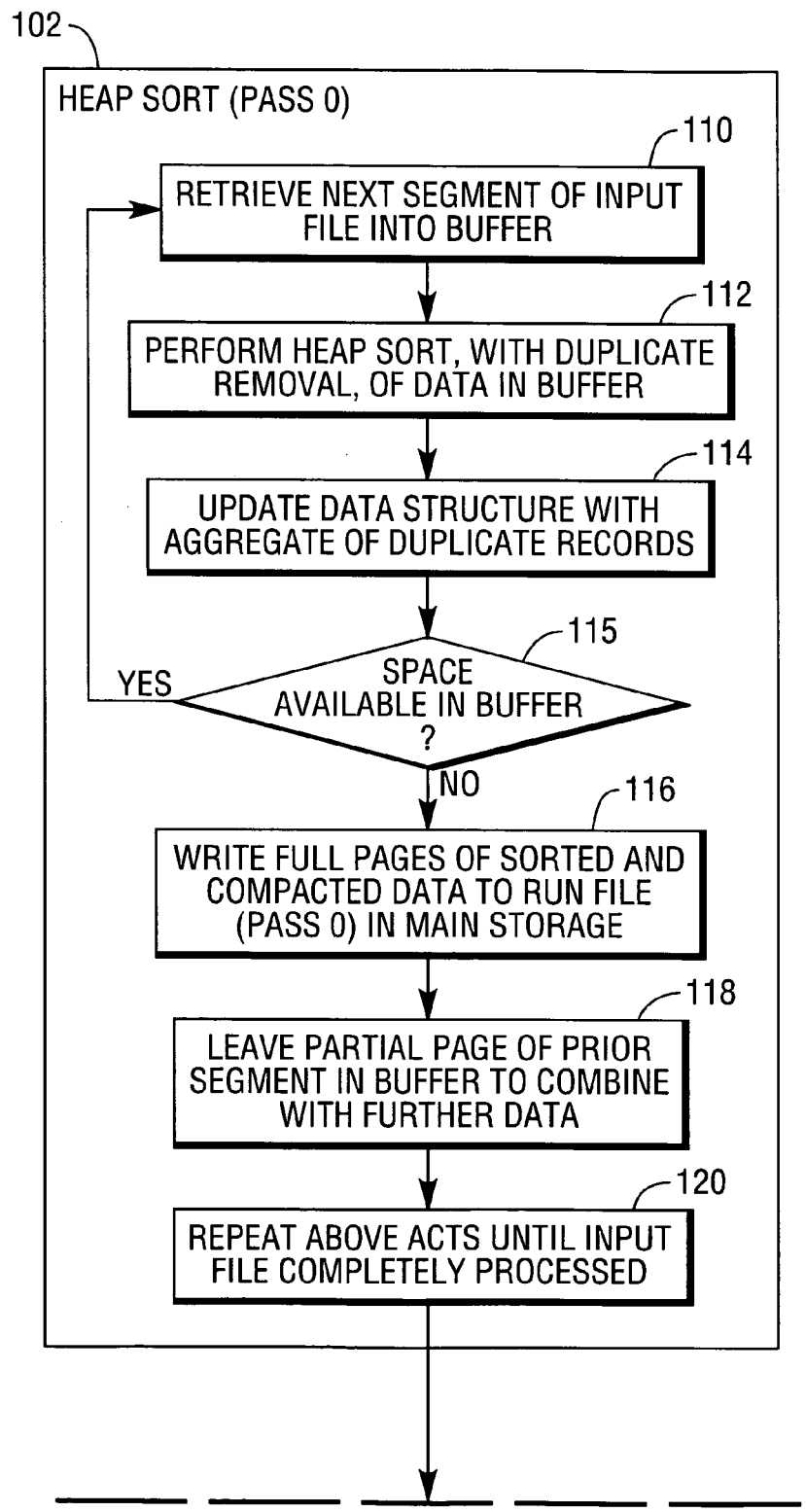
FIG. 2 is a flow diagram of a process performed by an embodiment of the present invention.
Figure 2B:
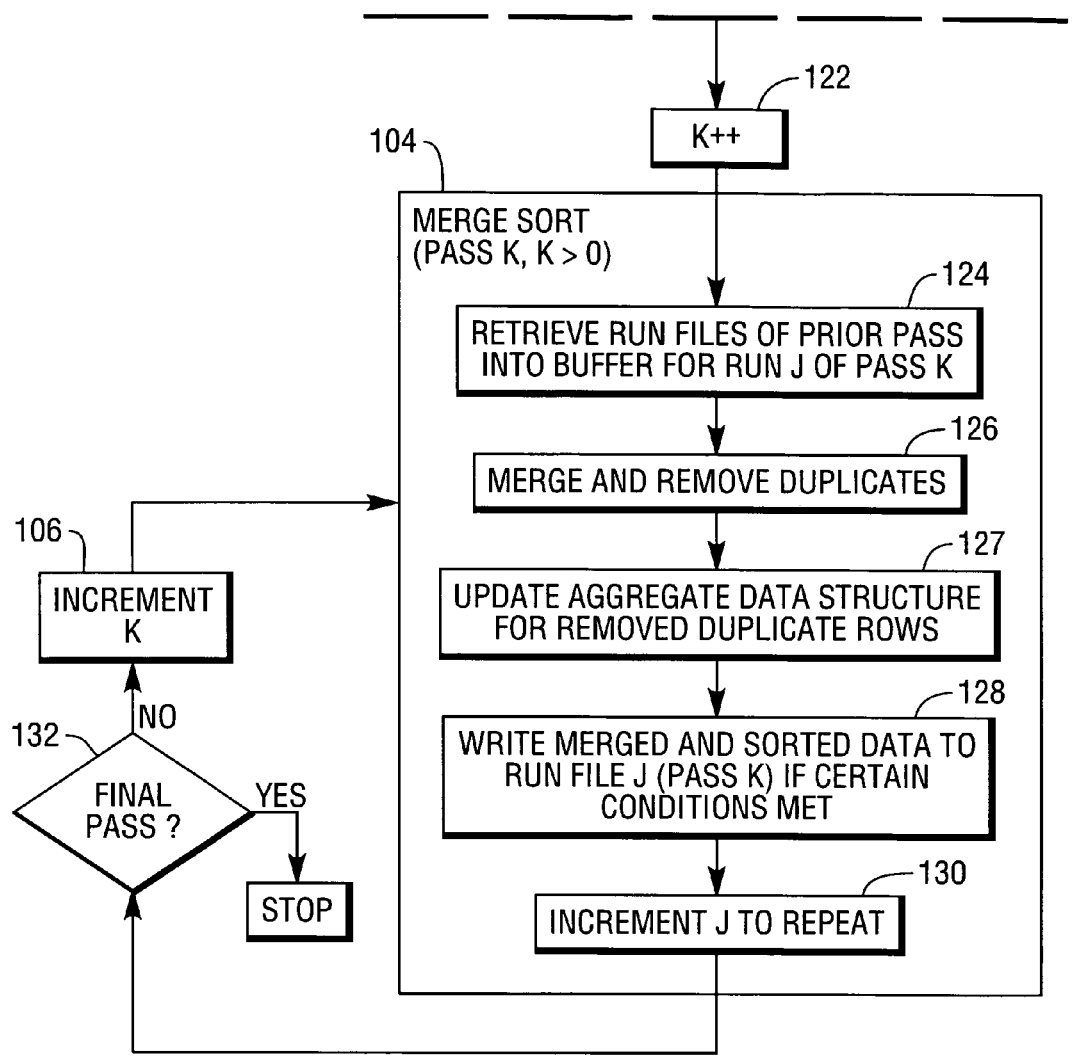

FIG. 2 is a flow diagram of a general process of performing sorts with duplicate removal to sort the records of an input file that is too large to fit within the buffer. A heap sort is first performed (at 102) in Pass 0. As discussed above, a number of passes are performed, with Pass K, K=0, 1, . . . , L, being the pass that is currently being performed. Thus, the heap sort is performed in pass K, where K=0.

Following the heap sort in Pass 0, further passes, Passes K, K>0, are performed (at 104) in which the run files output from prior passes are merged, sorted, and further compacted to remove duplicates. Pass 1 retrieves run files of Pass 0 to merge, sort, and compact; Pass 2 retrieves run files of Pass 1 to merge, sort, and compact; Pass 3 retrieves run files of Pass 2 to merge, sort, and compact; and so forth. In effect, Pass K, K>0, retrieves run files of Pass K−1 to merge, sort, and compact. As indicated at 106, the value K is incremented to perform as many additional passes as necessary to sort all distinct records of the input source filed 24.

In the heap sort performed at 102, segment I of the input source file 24 is retrieved (at 110) into the buffer for run I of Pass 0. The parameter I is initially set to some initial value, such as 0. Next, the CPU 14 performs (at 112) a heap sort of the segment I that is in the buffer, with duplicate rows removed during the heap sort. As part of the duplicate row removal process, the aggregate (e.g., SUM, COUNT, AVG, etc.) of duplicate rows is updated (at 114). For each distinct value of a record (e.g., group-by field or attribute), a data structure is defined to store the updated aggregate as duplicate rows are removed. For example, if T1.A is the group-by field, then each distinct value of T1.A is associated with a data structure that stores the sum of values of T1.B of all rows having the corresponding distinct value of T1.A.

The net effect of performing the heap sort with duplicate row removal is that segment I is sorted and compacted. Assuming M pages in the buffer, the initially retrieved segment I fills all pages 22_1, 22_2, . . . , 22_M of the buffer. After compaction, the compacted segment I will occupy less than all M pages of the buffer.

After sorting and compaction, the CPU 14 checks (at 115) if there is space in the buffer to retrieve further data from the input file 24. If so (e.g., if there is at least one full page 22 that is empty), the acts of 110, 112, and 114 are repeated. If not (e.g., there is not at least one full page 22 that is empty), then the CPU 14 writes (at 116) full pages of sorted and compacted pages to the currently open run file of Pass 0, with the partially filled page left (at 118) in the buffer. Partial pages are not written to the main storage 12 because writing a partially filled page to the main storage 12 is wasteful of I/O resources. The more efficient technique is to wait until the partially filled page is completely filled before writing the page back to main storage 12

This partially filled page is left in the buffer to combine with further data from the input source file 24. The provision of data from a prior segment to combine with further records of the input source file 24 is part of the coupling mechanism referred to earlier. Thus, effectively, records from a prior sorting and compaction operation is "coupled" to subsequently retrieved records. By performing such coupling, more efficient I/O processing can be achieved. Further details of the coupling mechanism are discussed below in connection with FIG. 3.

The CPU 14 then repeats (at 120) the acts of 110, 112, 114, 116, and 118 in subsequent runs until the entire input file 24 has been processed. Each run through 110, 112, 114, 116, and 118 is referred to as a "run," with each run involving the sorting and compacting of input data and writing of the compacted data to a corresponding run file of Pass 0. A characteristic of each run file is that the records contained in the run file are sorted. A further characteristic of the run file is that all records in the run file are distinct. As discussed above, the sorted run files are later merged in subsequent passes to ultimately produce the sorted output file 26 that contains sorted distinct records of the input source file 24.

To perform the next pass, the value of K is incremented (at 122), so that pass K is next performed. Pass K, K>0, involves performance of a merge sort (at 104). In the merge sort, a group of run files of the previous pass are retrieved (at 124) into the buffer to be processed in run J of pass K. For example, with M pages, M run files are retrieved into the buffer, with one run file for each page. J is initially set to some initial value, such as 0. Thus, in Pass 1, the run files of Pass 0 are retrieved into the buffer for processing; in Pass 2, the run files of Pass 1 are retrieved into the buffer for processing; and so forth.

The retrieved run files in the buffer are merged and sorted (at 126), with duplicate rows removed in the merge and sort operation. The data structure representing the aggregate for the duplicate rows is updated (at 127). The merged and sorted records are then written (at 128) to output run file J of Pass K if certain conditions are met, which are discussed further below. The parameter J is then incremented (at 130) to perform the next run in Pass K. The net effect of the merge sort performed at 104 is the production of run files for Pass K, with such run files of Pass K used in a subsequent pass for further combination. Ultimately, in the last pass (determined at 132), the merge sort performed at 104 will produce only one output file 26, which contains the sorted distinct records of the input source file 24.

Figure 3:
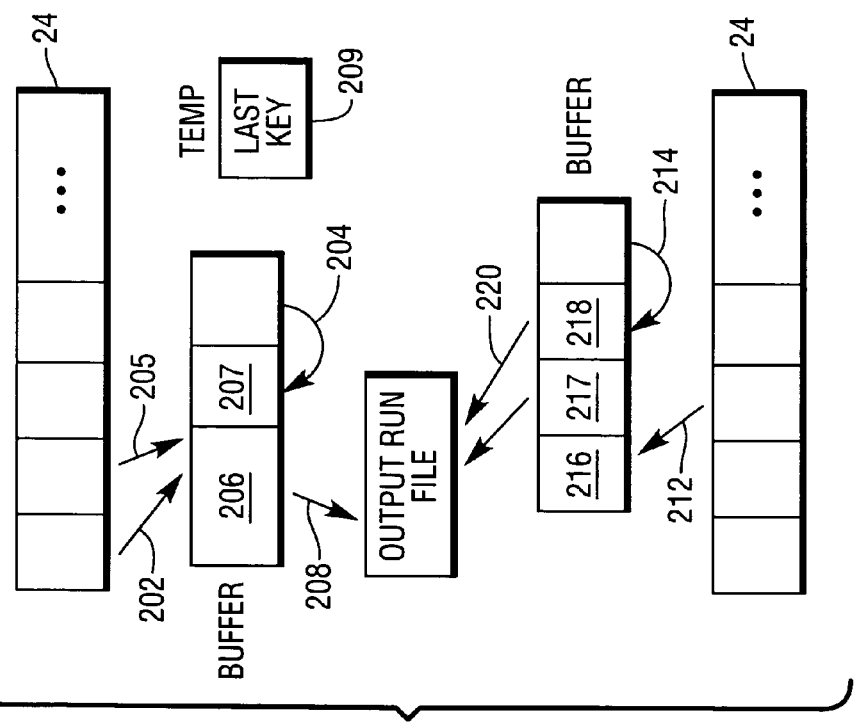
FIG. 3 illustrates events that occur in a heap sort algorithm that employs a coupling mechanism.

FIG. 3 illustrates the coupling technique that is performed in the heap sort 102. In a first run, a first segment 200 of records from the input source file 24 is retrieved (at 202) into the buffer. The heap sort with duplicate record elimination is performed (at 204). If space is available in the buffer after sorting and compaction, further data is retrieved (at 205) from the input source file 24. If the buffer is full (less than a full page is available in the buffer), then full pages 206 are written (at 208) to a currently open output run file. By continuing to retrieve more data if the buffer has available space, a larger group of data is sorted and compacted, resulting in more efficient processing.

For example, if the sorted and compacted data fills up M−1 full pages and a partial page, then only the M−1 full pages are written to the output run file, with the partial page left in the buffer to couple to the next segment. In FIG. 3, the full pages are represented as 206 while the partial page left in the buffer is represented as 207. In the described example, it is assumed that the sorting causes records to be sorted in ascending order. If that is the case, then the pages written (at 208) to a portion 210 of the output run file are the records with the smallest values. To track what has already been written, the CPU 14 also stores a "last key" (which is the record with the largest value written to portion 210 of the output run file) in a TEMP data structure 209. This allows the CPU 14 to track what has already been written to the currently open output run file so the smaller values than the last key in the TEMP data structure are not written to the output run file in subsequent operations. This is performed to maintain the records in the output run file in a predetermined sorted order (e.g., ascending order, descending order, etc.).

The next segment of data is retrieved (at 212) from the input source file 24 into the buffer. Heap sort with duplicate elimination is then performed (at 214) on combination of the retrieved segment with the portion 207 left from the previous segment. Technically, the retrieval of the next segment is part of the next run. However, note that the output run file is still open, so that certain of the records from the subsequent run (and records in the data portion 207) can be appended to the output run file. This effectively extends the size of the output run file. The heap sort with compaction is repeated with further data retrieved from the input source file 24 until the buffer can no longer receive any further data.

After the heap sort with duplicate removal is performed, the data in the buffer is made up of three portions: a portion 216 containing data values less than the smallest value in the portion 207; a portion 218 containing data values greater than the largest value of the portion 207; and a portion 217 containing data values between the smallest value and largest value of the portion 207. Full pages made up of the records having values greater than or equal to the last key are then written (at 220) to the output run file, with any partial page left in the buffer. The value of the last key in the TEMP data structure 205 is then updated to represent the largest value written to the output run file. The next segment is then retrieved, with the process shown in FIG. 3 repeated until there are no further full pages of sorted values in the buffer that are greater than or equal to the last key value. At this point, the output run file is closed and the next output run file is opened for writing.

Figure 4:
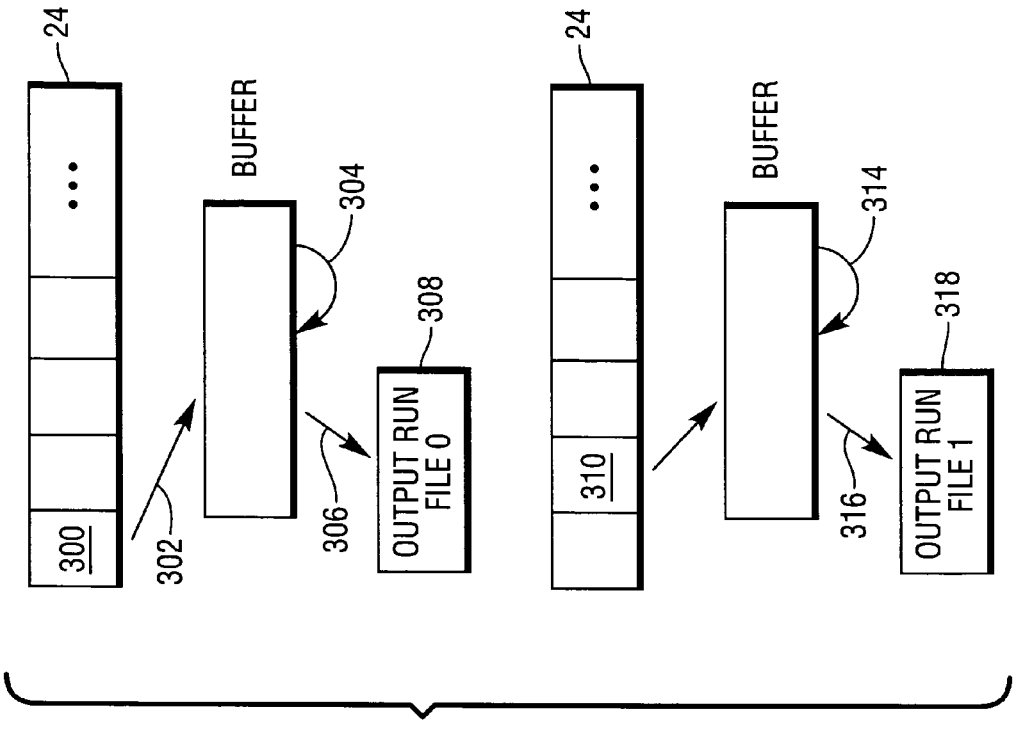
FIG. 4 illustrates events that occur in a heap sort algorithm that does not employ a coupling mechanism.

Alternatively, a heap sort with duplicate elimination process in which coupling is not performed is shown in FIG. 4. In FIG. 4, a first segment 300 of records is retrieved (at 302) into the buffer. The CPU 14 then performs (at 304) a heap sort with duplicate removal of the first segment 300 in the buffer. The sorted and compacted records are then written (at 306) to a first run file 308.

Subsequently, the next segment 310 of the input source file 24 is retrieved (at 312) into the buffer. The CPU 14 then performs a heap sort with duplicate record elimination (at 314) on segment 310. The sorted and compacted segment is then written (at 316) to a second run file 318. This is repeated until all segments of the input source file 24 have been processed.

Figure 5:
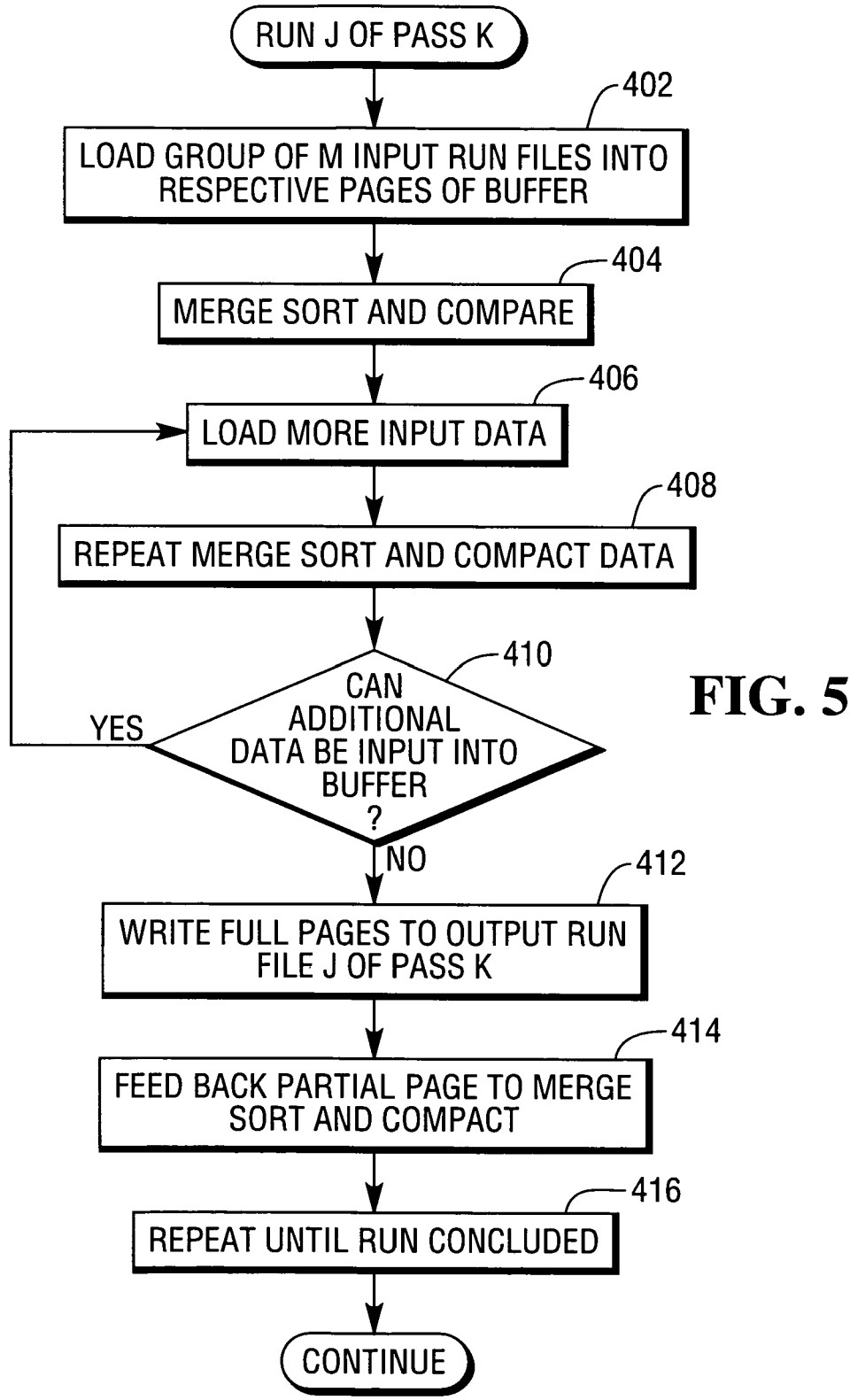
FIG. 5 is a flow diagram of a merge sort algorithm according to one embodiment.
Figure 6:
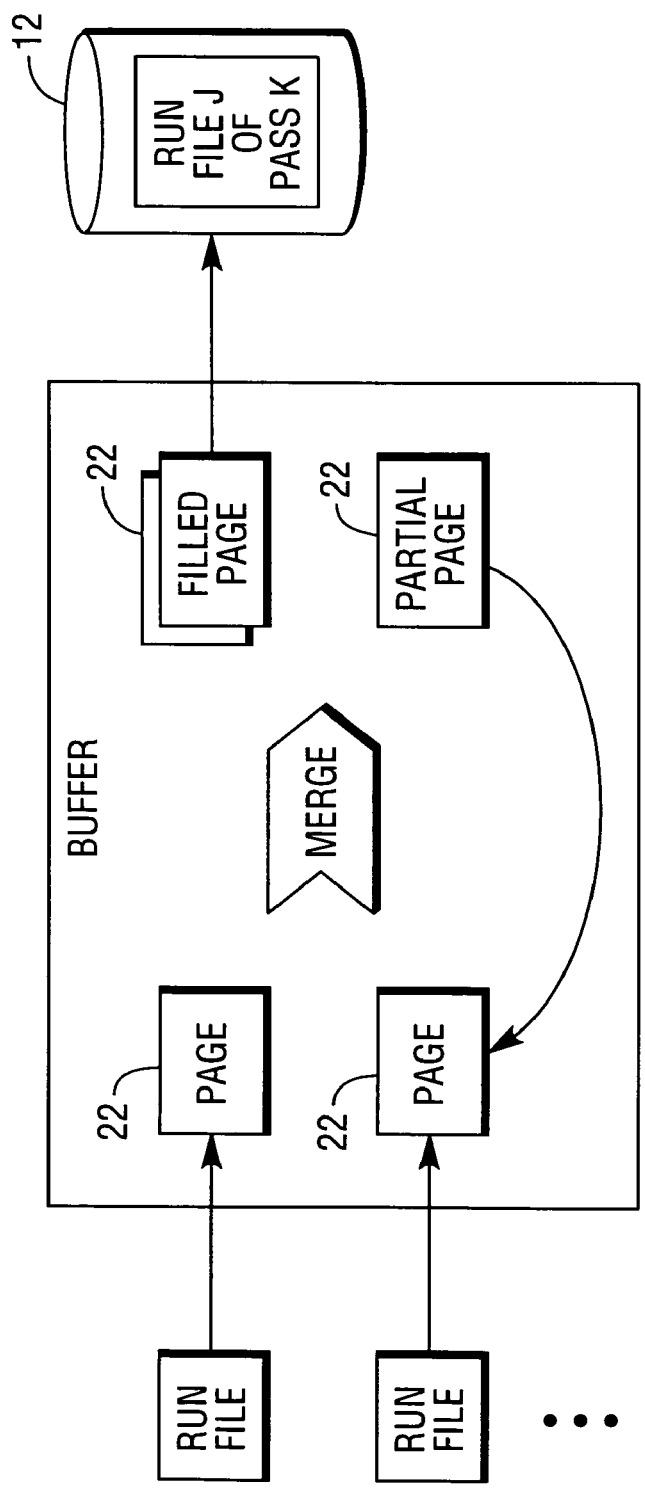
FIG. 6 illustrates events that occur in the merge sort algorithm of FIG. 5.

FIGS. 5 and 6 illustrate the merge sort procedure according to one embodiment. FIG. 5 shows the general process for Run J of Pass K, K>0. The CPU 14, in performing Run J of Pass K, inputs (at 402) a group of input run files (from Pass K−1) into respective pages. Thus, as shown in FIG. 6, the run files of Pass K−1 are each input to a respective page 22 of the buffer. For a buffer having M pages, records from M input run files can be loaded into the buffer. Note that the total amount of data stored in the M run files may be greater than the size of the buffer. As a result, only a portion of each run file is loaded into the respective page 22 in the buffer. The remaining portions of each run file in the group is later retrieved after processed data in the buffer has been written to the output run file J of Pass K.

As further shown in FIG. 5, after portions of the group of M input run files have been loaded into respective pages 22, the CPU 14 performs a merge sort and compact (duplicate row removal) operation on the data contained in the buffer. After the merge sort and compact operation, space is freed up in the buffer so that more input data (from the M run files) is loaded (at 406) into the buffer. The merge sort and compact is then repeated (at 408) to further sort and compact data in the buffer. Next, the CPU 14 checks (at 410) if more input data can be loaded from the input run files to the buffer (e.g., there is at least one page that is empty). If so, acts 406 and 408 are repeated.

However, if more data cannot be loaded into the buffer, the CPU 14 writes (at 412) full pages of sorted data to the output run file J of Pass K. However, it is likely that a partial page is left in the buffer. This partial page is fed back (at 414) to be processed with subsequently retrieved data from the input run files. Thus, acts 402, 404, 406, 408, 410, 412, and 414 are repeated for Run J of Pass K until the run is concluded. A run is concluded if no more data can be written to the output run file J of Pass K. This will be the case if the data remaining in the buffer contain values that are less than the largest value stored in the run file J of Pass K. To maintain the sorted order of the output run file, such remaining data in the buffer is not written to the output run file, but instead, is fed back to the next run. At the conclusion of a run, the output run file J of Pass K is closed, and the run file for the next run is opened, with the process shown in FIG. 5 repeated for the next run.

A further discussion of heap sort according to one embodiment is provided below. As noted above, a heap sort causes the data contained in the buffer to be converted into a heap (a process referred to as building a heap). The heap is represented as a binary tree, with an example shown in FIG. 7, which is an 8-node binary tree. Note that the actual tree will be much bigger to contain as many nodes as there are data elements in the buffer. The buffer is represented as an array containing the data elements. The root of the binary tree is considered to be the last index of the array. The left node of the root is the second index from the last, and so on.

Figure 7:
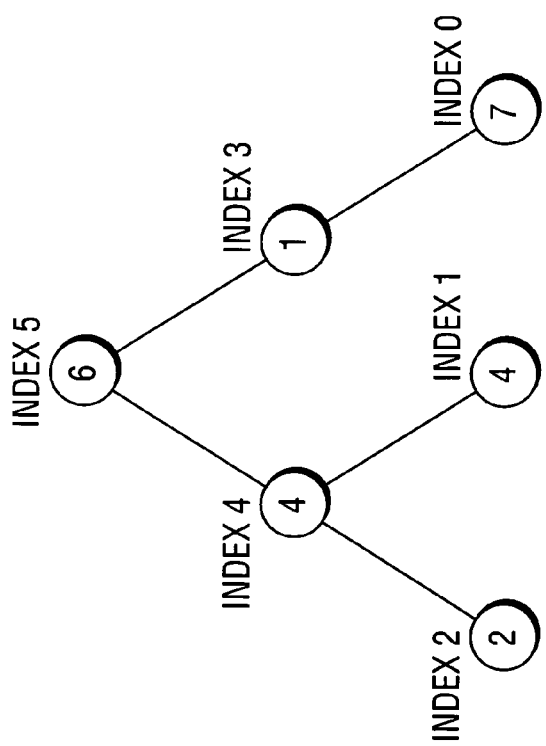
FIGS. 7 and 8 illustrate tree structures employed by the heap sort algorithm according to some embodiments.
Figure 8:
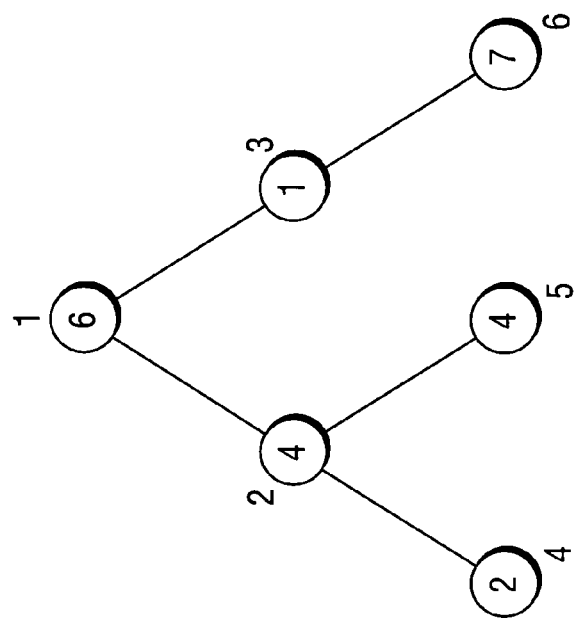

The binary tree data structure shown in FIG. 7 is not easily manipulated by software. Therefore, the binary tree FIG. 7 is transformed to a tree of parent/children indexes shown in FIG. 8, which has a different index structure. Each node of the binary tree of FIG. 7 is associated with index iA, while each node of the tree of parent/children indexes of FIG. 8 is associated with index iT. The indexes iA and iT have the following relationship:

$$iT+iA=n,$$

where n is the length of the array. Moreover, in the tree of indexes shown in FIG. 8, if node i is a parent, then nodes (2*i) and (2*i+1) are the two children of the parent. The formulations given above define a heap. The pseudocode for the heap sort algorithm according to one embodiment is provided below. Note, however, that the pseudocode merely shows one example implementation of the heap sort algorithm; other embodiments use other sorting algorithms.

A routine heapsort2( ) is defined by the pseudocode in FIG. 9. The routine heapsort2( ) calls another routine referred to as percDown2( ), defined by the pseudocode in FIG. 10. The routine heapsort2( ) also calls another routine referred to as swapReferences( ), defined by the pseudocode in FIG. 11.

Generally, a heap sort involves the following events:
(1) build the array of data (in the buffer) into a heap (tree structure shown in FIG. 8), with the heap property that children have larger values than their parent (for sort in ascending order);
(2) perform the percolate process by the perc2down( ) routine to achieve the heap with the above heap property;
(3) move the minimum value at the root out of the tree and into a sorted array (which is basically a portion of the buffer to store the sorted records as the heap sort progresses);
(4) rebuild the heap using the perc2down( ) routine with one fewer element; and
(5) repeat events (3) and (4) until sorting has been completed.

Figure 12:
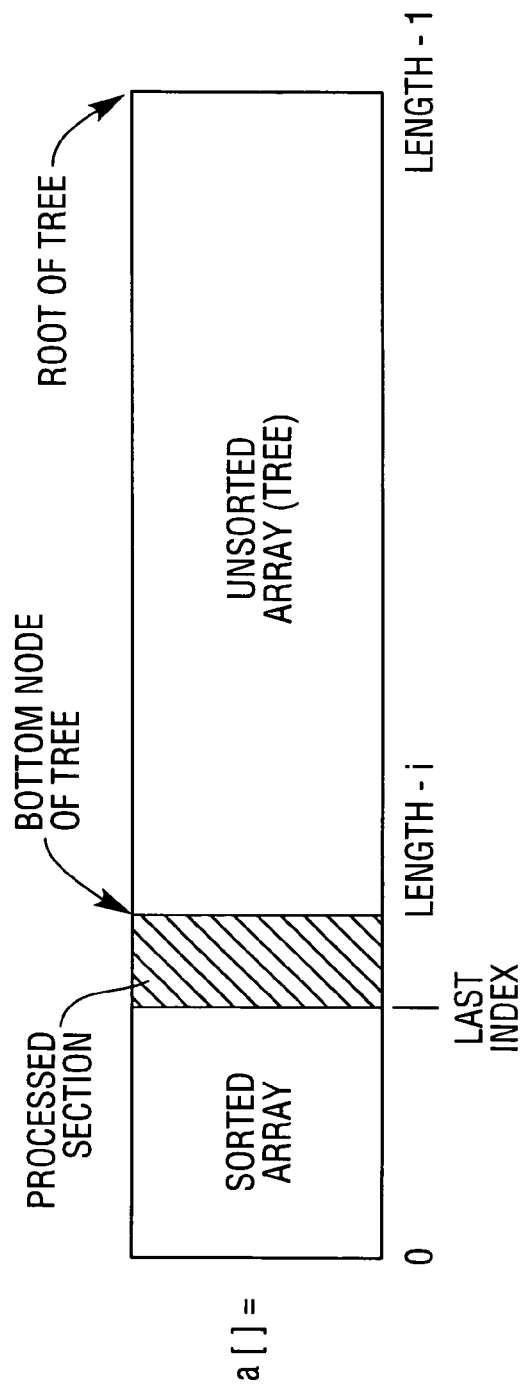
FIG. 12 illustrates an array structure processed by the heap sort algorithm.

In the heapsort2( ) pseudocode shown in FIG. 9, "a[ ]" represents the array of records in the buffer, "a.length" represents the length (referred to as "Length") of the array, and "Lastindex" represents the current position of the sorted array. FIG. 12 shows the array (containing the data in the buffer), which is being processed according to the heap sort algorithm. Initially, the entire array a[ ] is unsorted and the tree (unsorted array) fills up the entire array. However, once the heap sort process starts, the tree shrinks as data elements are moved out of the tree into the sorted array. This is indicated by the value of Lastindex starting at zero and incrementing as more data is added to the sorted array. The left edge a[Length–i] of the unsorted array represents the bottom node of the tree, while the right edge of the unsorted array represents the root of the tree a[Length–1]. During heap sort processing, the data element at the root is moved to a[Lastindex], which represents the current position of the sorted array to which further data is to be added.

Also note that, initially, the positions of Lastindex and the bottom of the tree (Length–i) are the same. However, once duplicates are removed after processing, a gap (referred to "processed section" in FIG. 12) is developed between Lastindex and the bottom of the tree (Length–i). The processed section represents records that have been removed due to duplicate elimination.

In the section 502 of the heapsort2( ) pseudocode, Lastindex is initialized to zero after the heap has been built. In the section 504, the data element at the root of the tree a[rootA] is moved to a[0], which is the first portion of the sorted array. The value of a[rootA] is stored in a "temp" variable to compare to subsequent values in the tree for purposes of record removal. The value of Lastindex is incremented.

In section 506, perc2down( ) is called again to rebuild the tree after the root has been deleted.

As indicated in section 510, if the root data element at the root contains a value that is a duplicate of the last value to be moved into the sorted array, then duplicate removal is applied (instead of moving the root data element to the sorted array) and the aggregate count associated with a[Lastindex–1], represented as a[Lastindex–1].count, is updated with the content of the duplicate record. Duplicate rows are indicated by the following condition evaluating true: a[rootA].key=temp.key. Duplicate removal causes the gap to be developed between Lastindex and Length–i in FIG. 12.

However, as indicated by section 510, if a[rootA] is not a duplicate, then the content of a[rootA] is moved to the sorted array element a[Lastindex], and Lastindex is incremented. Special processing is performed if the root of the tree is also the last element of the sorted array, indicated by Length–i=Lastindex evaluating to true, as shown in section 512. In this case, no duplicates have been found so far. Therefore, the contents of the array a[ ] are swapped without losing any of them.

FIG. 1 referred to above describes one embodiment of a database system. According to another embodiment, the database system is a parallel database system as configured in FIG. 13. The database system is referred to generally as 500, and the database system 500 includes multiple nodes 502. Certain of the nodes 502 include multiple access module processors (AMPs) 504 that are capable of concurrently managing access of data stored in respective storage modules 506. The collection of storage modules 506 makes up a main or persistent storage of the database system 500. In addition, although not shown, each node 502 includes one or more CPUs on which the AMPs 504 (which are software modules) are executable. In one embodiment, the AMPs 504 are based on AMPs used in TERADATA® systems from NCR Corporation.

Figure 13:
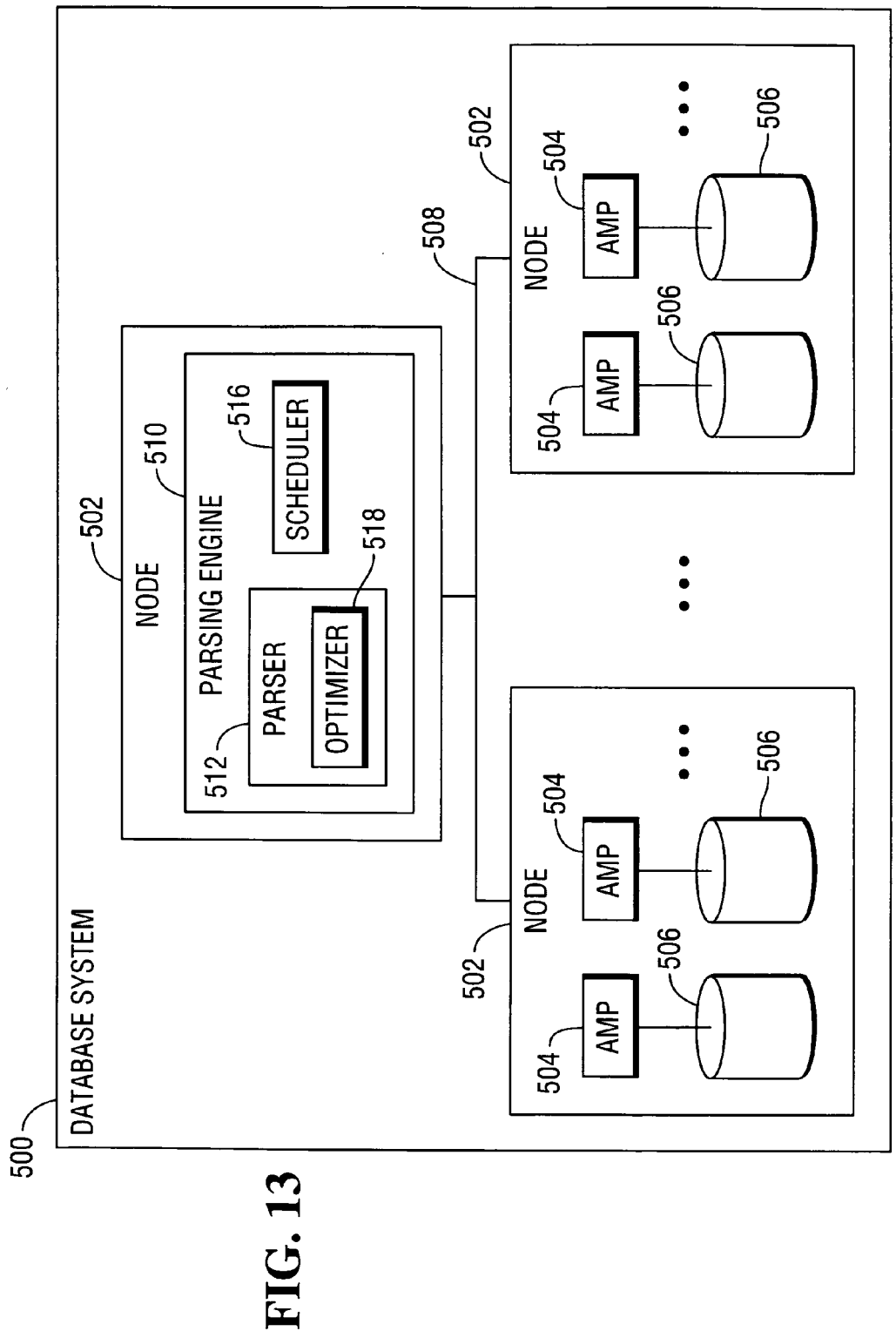
FIG. 13 is a block diagram of a parallel database system in which some embodiments of the invention are implemented.

The AMPs are coupled over an interconnect layer 508 to one or more parsing engines 510. In the example of FIG. 13, one parsing engine 510 is shown as being executable in one node 502. However, in other embodiments, multiple parsing engines can be present in any node, including multiple nodes.

The AMPs 504 respond to steps (in the form of instructions or commands) received from the parsing engine 510. Responsibilities of the AMPs 504 include locking databases, tables, and portions of tables; creating, modifying, or deleting definitions of tables; inserting, deleting, or modifying rows within tables; and retrieving information from definitions and tables. The AMPs 16 also return responses (e.g., data accessed from tables stored in storage modules 506) to the parsing engine 510.

The parsing engine 510 includes a parser 512 and a scheduler 516. When the parsing engine 510 receives an SQL request from a client application, the parser 512 interprets the SQL statement, checks it for proper SQL syntax, and evaluates it semantically. The parser 512 also includes an optimizer 518 whose role is to develop the least expensive execution or query plan to return the requested response. Several alternative query plans are evaluated and the most efficient query plan is selected by the optimizer 518. The selected query plan is then converted into executable steps that are submitted to the AMPs 504 for execution. The parser 512 passes the generated steps to the scheduler 516, which controls the sequence in which the steps are communicated to the AMPs 504 for execution.

In the context of the various embodiments discussed above, the buffer is stored in either cache or main memory of each node, and the sorting operations are performed by CPUs in the respective nodes 502.

The CPUs referred to in this discussion perform various acts under the control of instructions of various software routines or modules, such as the database management software 16, heapsort2( ) routine, and others. The instructions of the software routines or modules are stored on one or more storage devices in the database system and loaded for execution on the CPUs. The CPUs include microprocessors, microcontrollers, processor modules or subsystems (including one or more microprocessors or microcontrollers), or other control or computing devices. As used here, a "controller" refers to hardware, software, or a combination thereof. A "controller" can refer to a single component or to plural components (whether software or hardware).

Data and instructions (of the various software routines or modules) are stored in respective storage devices, which are implemented as one or more machine-readable storage media. The storage media include different forms of memory including semiconductor memory devices such as dynamic or static random access memories (DRAMs or SRAMs), erasable and programmable read-only memories (EPROMs), electrically erasable and programmable read-only memories (EEPROMs) and flash memories; magnetic disks such as fixed, floppy and removable disks; other magnetic media including tape; and optical media such as compact disks (CDs) or digital video disks (DVDs).

The instructions of the software routines or modules are loaded or transported to the database system in one of many different ways. For example, code segments including instructions stored on floppy disks, CD or DVD media, a hard disk, or transported through a network interface card, modem, or other interface device are loaded into the system and executed as corresponding software modules or layers. In the loading or transport process, data signals that are embodied in carrier waves (transmitted over telephone lines, network lines, wireless links, cables, and the like) communicate the code segments, including instructions, to the system. Such carrier waves are in the form of electrical, optical acoustical, electromagnetic, or other types of signals.

While the invention has been disclosed with respect to a limited number of embodiments, those skilled in the art will appreciate numerous modifications and variations therefrom. It is intended that the appended claims cover such modifications and variations as fall within the true spirit and scope of the invention.

What is claimed is:

1. A method of processing a file in a system that has a size larger than a size of a buffer in volatile storage in the system, the method comprising:
    retrieving segments of the file from persistent storage into the buffer in the volatile storage;
    sorting each segment in the buffer;
    removing duplicate records while sorting each segment in the buffer;
    after the sorting and duplicate records removing, determining whether the buffer contains space to retrieve at least a further segment from the file in the persistent storage;
    in response to determining that the buffer contains the space, retrieving the at least further segment into the buffer to perform further sorting and duplicate records removing to compact the segments in the buffer;
    writing the sorted and compacted segments to the persistent storage of the system,
    wherein writing the sorted and compacted segments to the persistent storage comprises writing just full pages of the sorted and compacted segments from the buffer to the persistent storage;
    leaving a partial page of the sorted and compacted segments in the buffer; and
    retrieving at least another segment of the file from the persistent storage into the buffer to sort and compact, by performing removal of duplicate records, with the partial page in the buffer.

2. The method of claim 1, further comprising storing the file in the persistent storage.

3. The method of claim 1, wherein writing the sorted and compacted segments comprises writing the sorted and compacted segments to plural run files in the persistent storage, the run files being part of a first set, wherein the compacted segments have duplicate records removed.

4. The method of claim 3, further comprising:
    loading the first set of run files into the buffer;
    merging data of the first set of run files in the buffer.

5. The method of claim 4, wherein merging the data of the first set of run files comprises performing sorting of the data and compacting the data by performing removal of duplicate records.

6. The method of claim 4, wherein loading the first set of run files comprises loading a first portion of the first set of run files into the buffer, and wherein merging the data comprises sorting and compacting the data in the first portion by performing removal of duplicate records.

7. The method of claim 5, further comprising writing the sorted and compacted data of the run files in the first set to run files in a second set.

8. The method of claim 6, further comprising loading a second portion of the first set of run files into the buffer, sorting and merging the second portion with the sorted and compacted first portion, and compacting the merged second portion and compacted first portion by performing removal of duplicate records.

9. The method of claim 7, further comprising loading the second set of run files into the buffer and merging the data of the second set in the buffer by performing sorting of the data of the second set and compacting the data of the second set by performing removal of duplicate records.

10. The method of claim 1, further comprising combining one sorted and compacted segment with a subsequent segment to further perform sorting and compacting of the combined segments.

11. The method of claim 1, wherein sorting each segment and removing duplicate records comprise performing a heap sort of each segment, wherein the heap sort comprises performing duplicate record removal.

12. The method of claim 1, further comprising updating an aggregate of a specified one or more attributes as duplicate records are removed.

13. An article comprising at least one storage medium containing instructions that when executed cause a system to:
    successively retrieve, from persistent storage, portions of an input file into a buffer in volatile storage in the system;
    sort each portion in the buffer;
    remove duplicate records in each portion during sorting in the buffer;
    after the sorting and duplicate records removing, determining whether the buffer contains space to retrieve at least a further portion from the input file in the persistent storage;
    in response to determining that the buffer contains the space, retrieving the at least further portion into the buffer to perform further sorting and duplicate records removing in the buffer to compact the portions in the buffer;
    write the sorted and compacted portions to output files in the persistent storage, wherein writing the sorted and compacted segments to the persistent storage comprises writing just full pages of the sorted and compacted segments from the buffer to the persistent storage;

leave a partial page of the sorted and compacted segments in the buffer; and retrieve at least another segment of the file from the persistent storage into the buffer to sort and compact, by performing removal of duplicate records, with the partial page in the buffer.

14. The article of claim 13, wherein writing the sorted and compacted portions comprises writing the sorted and compacted portions to plural run files in the persistent storage, the run files being part of a first set, wherein each compacted portion has duplicate records removed.

15. The article of claim 14, wherein the instructions when executed cause the system to further:

load the first set of run files into the buffer; and merge data of the first set of run files in the buffer.

16. The article of claim 15, wherein merging the data of the first set of run files comprises performing sorting of the data and compacting the data by performing removal of duplicate records.

17. The article of claim 15, wherein loading the first set of run files comprises loading a first part of the first set of run files into the buffer, and wherein merging the data comprises sorting and compacting the data in the first part.

18. The article of claim 16, wherein the instructions when executed cause the system to further write the sorted and compacted data of the run files in the first set to run files in a second set.

19. The article of claim 17, wherein the instructions when executed cause the system to further load a second part of the first set of run files into the buffer, and to sort and merge the second part with the sorted and compacted first part.

20. The article of claim 13, wherein sorting each portion and removing duplicate records comprise performing a heap sort of each portion, wherein the heap sort comprises performing duplicate record removal.

21. The article of claim 13, wherein the instructions when executed cause the system to update an aggregate of a specified one or more attributes as duplicate records are removed.

* * * * *